United States Patent
Yamada

(10) Patent No.: US 9,209,928 B2
(45) Date of Patent: Dec. 8, 2015

(54) TRANSMISSION DEVICE AND TRANSMISSION METHOD

(71) Applicant: FUJITSU LIMITED, Kawasaki-shi, Kanagawa (JP)

(72) Inventor: Hirotaka Yamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 95 days.

(21) Appl. No.: 14/060,152

(22) Filed: Oct. 22, 2013

(65) Prior Publication Data

US 2014/0140219 A1    May 22, 2014

(30) Foreign Application Priority Data

Nov. 22, 2012  (JP) ................. 2012-256932

(51) Int. Cl.
  *H04L 1/00* (2006.01)
  *H04L 1/22* (2006.01)
(52) U.S. Cl.
  CPC ... *H04L 1/00* (2013.01); *H04L 1/22* (2013.01)
(58) Field of Classification Search
  CPC ........................................ H04L 1/00
  USPC .................. 370/217–242, 419–514
  See application file for complete search history.

(56) References Cited

U.S. PATENT DOCUMENTS

| 7,345,991 B1 * | 3/2008 | Shabtay et al. | 370/221 |
| 2009/0245097 A1 * | 10/2009 | Takakuwa | 370/217 |
| 2013/0028072 A1 * | 1/2013 | Addanki | 370/218 |

FOREIGN PATENT DOCUMENTS

| JP | 2008-131614 | 6/2008 |
| JP | 2008-131615 | 6/2008 |

* cited by examiner

*Primary Examiner* — Iqbal Zaidi
(74) *Attorney, Agent, or Firm* — Staas & Halsey LLP

(57) ABSTRACT

A transmission device that transmits a frame through either of a plurality of interface device, the transmission device includes a memory, and a first processor coupled to the memory and configured to transmit the frame to at least one of the plurality of interface device, when a connection fault has occurred in a line coupled to the plurality of interface device and a device internal fault has not occurred in the at least one of the plurality of interface device.

10 Claims, 17 Drawing Sheets

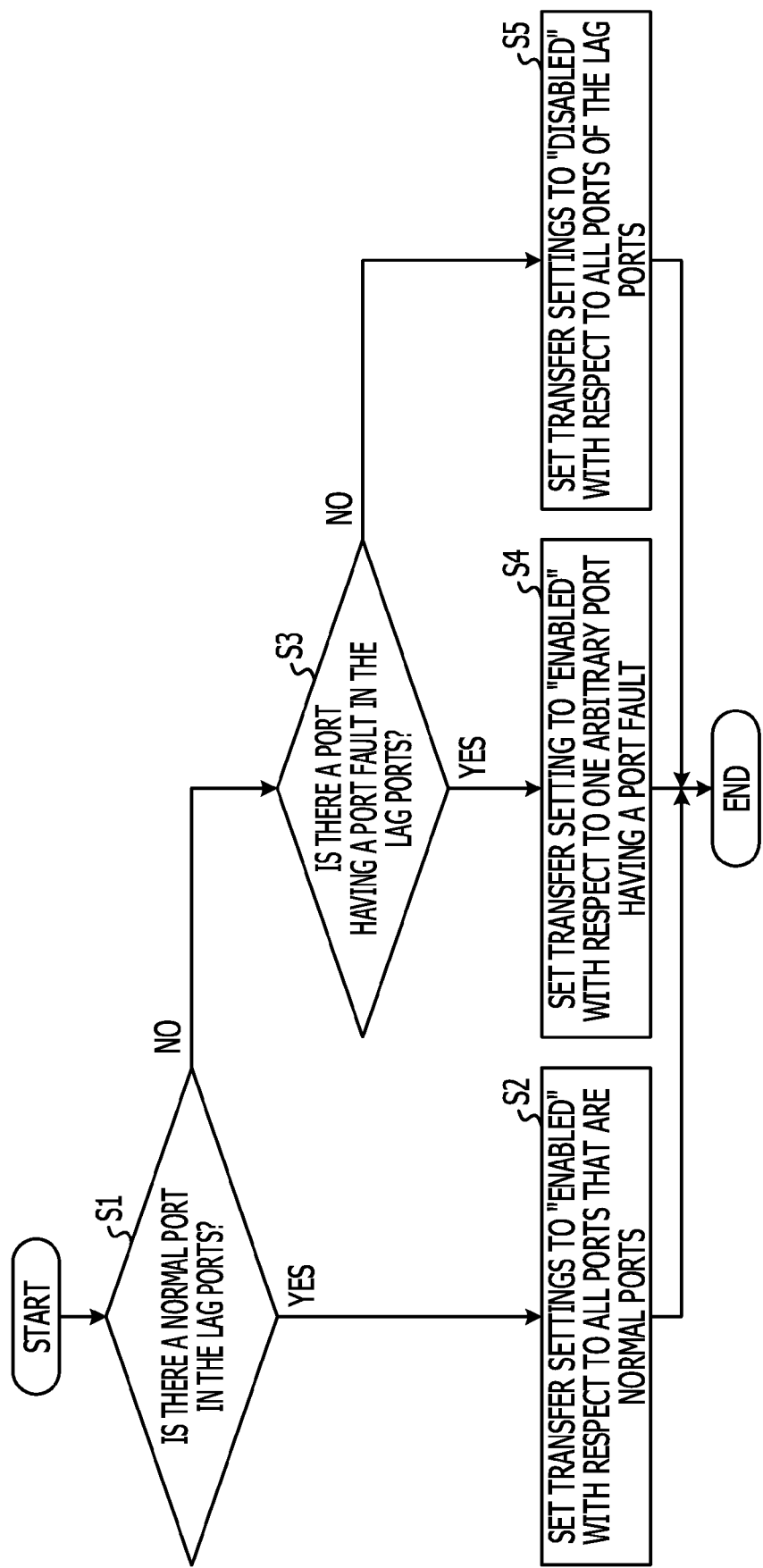

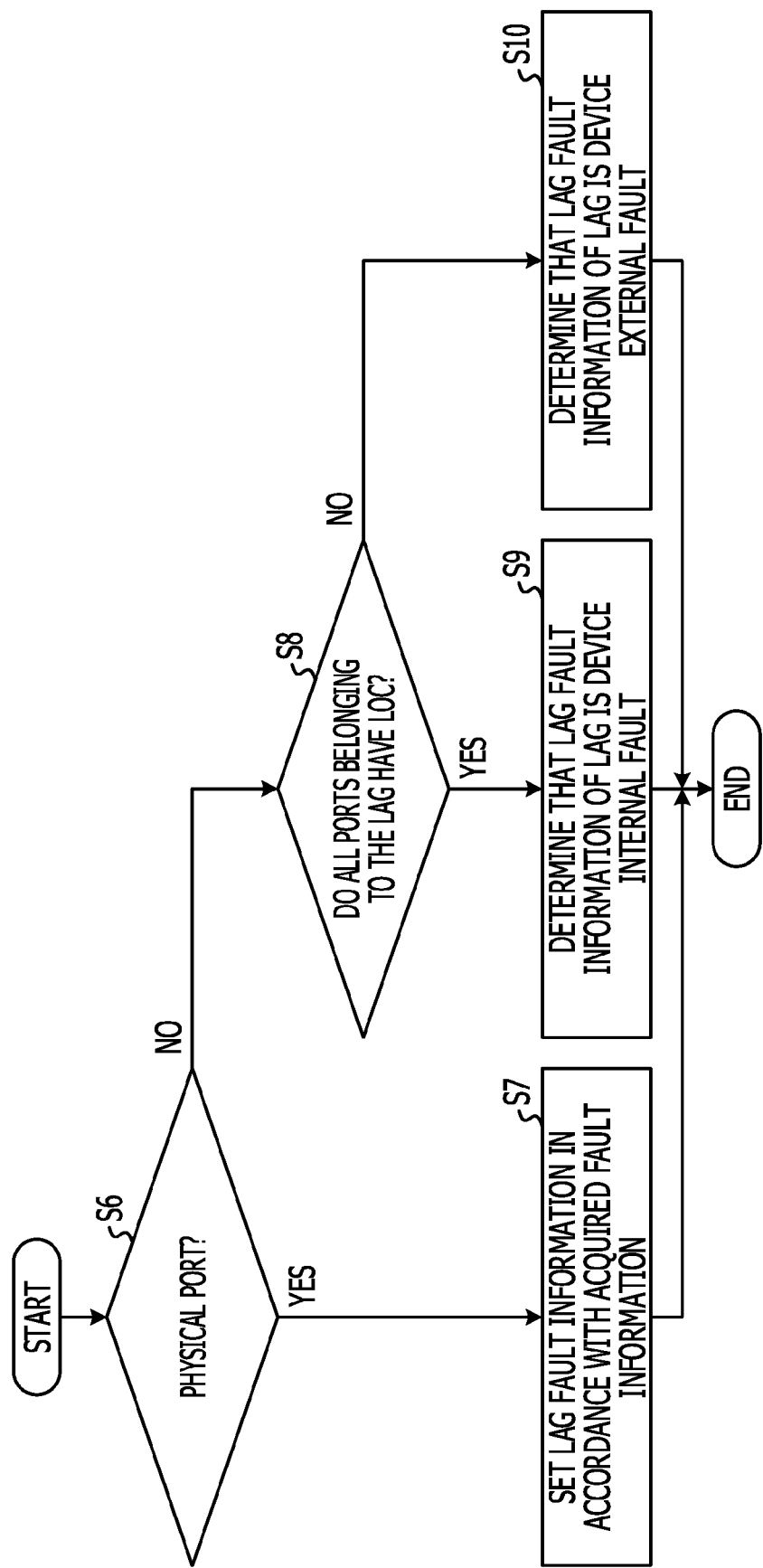

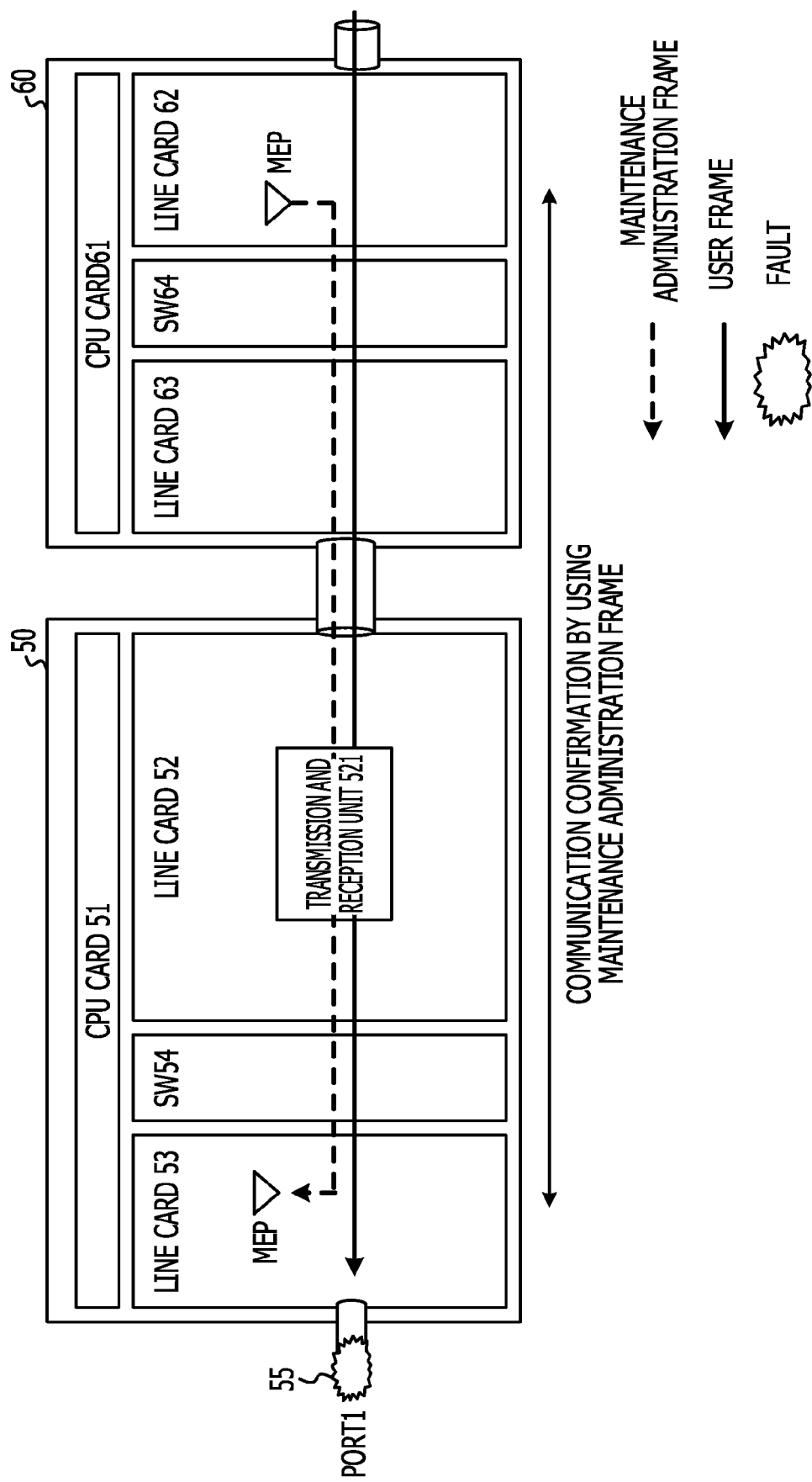

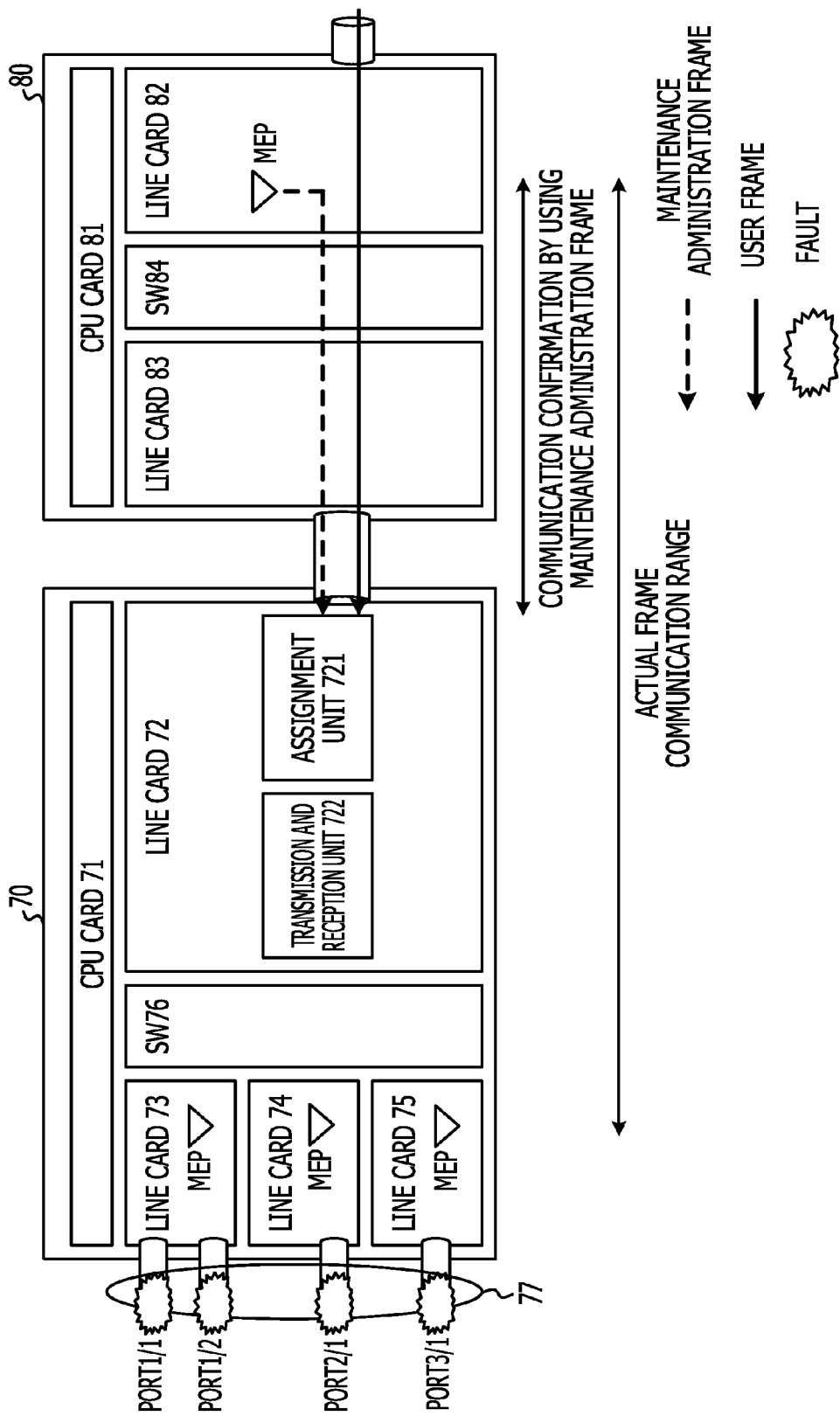

TRANSMISSION DEVICE AND TRANSMISSION METHOD

CROSS-REFERENCE TO RELATED APPLICATION

This application is based upon and claims the benefit of priority of the prior Japanese Patent Application No. 2012-256932 filed on Nov. 22, 2012, the entire contents of which are incorporated herein by reference.

FIELD

The embodiment discussed herein is related to a transmission device and a transmission method.

BACKGROUND

In recent years, in transmission devices such as layer 2 switches used in Ethernet (registered trademark), link aggregation in which a plurality of physical lines are treated virtually as a single line is used in order to expand communication bands and achieve redundancy of physical lines. In Ethernet (registered trademark), an operation, administration, and maintenance (OAM) function (hereafter referred to as a maintenance administration function) is used, in which faults of layer 2 switches belonging to a network and faults between layer 2 switches are monitored by transmitting and receiving OAM frames (hereafter referred to as maintenance administration frames), which are frames for operation, maintenance, and administration purposes.

As a related technology, a communication device such as a layer 2 network device has a first port that transmits and receives data frames with a first communication device, and has a plurality of second ports that transmit and receive data frames with a second communication device by link aggregation. The communication device has a way of duplicating OAM frames, with which an OAM frame received from the first port is duplicated so as to be transmitted to all of the plurality of second ports. A technology is known with which link faults between communication devices are detected by a communication device that transfers OAM frames to all links forming a link aggregation (see Japanese Laid-open Patent Publication No. 2008-131615).

In the transmission device 50 that forms a physical port 55 depicted in FIG. 16, since maintenance administration frames are transferred from a line card 52 to a line card 53 even if a port fault occurs, faults within the transmission device 50 are able to be monitored using a maintenance administration function.

A transmission device 70 that is used in the aforementioned maintenance administration technology and is depicted in FIG. 17 forms a link aggregation group (LAG) in which a plurality of ports are bundled together by link aggregation. If all of the ports belonging to LAG 77 are in a fault state (link-down state), an assignment unit 721 stops the transfer of frames from a line card 72 to line cards 73 to 75. Link aggregation is hereafter also referred to as LA.

The stopping of the transfer of frames by the assignment unit 721 is likewise applied also to user frames for carrying out requests and data transfer and so on, and to maintenance administration frames that confirm network communication. User frames and maintenance administration frames are hereafter also jointly referred to as frames.

In the case of a port fault such as the poor connection or disconnection of a cable, a card fault due to the failure of a card inside a device, and an inter-card fault such as the severing of a signal line between cards (hereafter also referred to as a fault other than a port fault, and also as a device internal fault), maintenance administration frames are likewise not communicated within the transmission device 70. Consequently, there has been a problem in that an administrator is not able to specify a port fault and a fault other than a port fault even when using a maintenance administration function implemented by a network operation system (hereafter referred to as OpS).

SUMMARY

According to an aspect of the invention, a transmission device that transmits a frame through either of a plurality of interface device, the transmission device includes a memory, and a first processor coupled to the memory and configured to transmit the frame to at least one of the plurality of interface device, when a connection fault has occurred in a line coupled to the plurality of interface device and a device internal fault has not occurred in the at least one of the plurality of interface device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a drawing illustrating a method for setting transfer settings in an assignment table;

FIG. 15 is a drawing illustrating the setting of LAG fault information in a determination table;

FIG. 16 is a block diagram depicting an example of a node device having an optical transmission device; and FIG. 17 is a block diagram depicting an example of a node device having an optical transmission device.

DESCRIPTION OF EMBODIMENT

Embodiment

A transmission device of an embodiment will now be described.

The transmission device of the embodiment supports link aggregation. Link aggregation is a technology with which a plurality of physical lines are treated as a single line. The transmission device of the embodiment is hereafter also simply referred to as a transmission device.

The transmission device uses a reception-side port (hereafter also referred to as a first port) to receive a frame. If the received frame is addressed to an LAG, the transmission device assigns the received frame to any one transmission-side port (hereafter also referred to as a second port) belonging to the destination LAG.

When assigning the frame, if all of the second ports belonging to the LAG are in a fault state, the transmission device stops the transmission of the frame to that LAG. When stopping the transmission of the frame, the transmission device extracts a second port having a port fault from among the LAG, and transfers a maintenance administration frame to the extracted second port. If there is no second port having a port fault, the transmission device stops the transfer of the frame at the reception side. Fault states include a port fault and a fault other than a port fault. In other words, the fault state of a port is a state in which the port is in a link-down state.

Therefore, if the maintenance administration frame is received by a communication circuit having a transfer-destination second port (hereafter also referred to as a second communication circuit) after the maintenance administration frame is transferred from a communication circuit having a first port (hereafter also referred to as a first communication circuit), the transmission device determines that the fault state of the transmission-side port is caused by a port fault.

If the maintenance administration frame is not received by the communication circuit having the transfer-destination second port after the maintenance administration frame is transferred, the transmission device determines that the fault state of the transfer-destination second port is caused by a fault other than a port fault.

As described above, the transmission device of the embodiment is able to determine a port fault and a fault other than a port fault by using only a maintenance administration function. Consequently, when determining the fault state of a port, the transmission device of the embodiment is able to easily determine the fault state without necessitating an administrator to directly operate the device.

Figure 1:
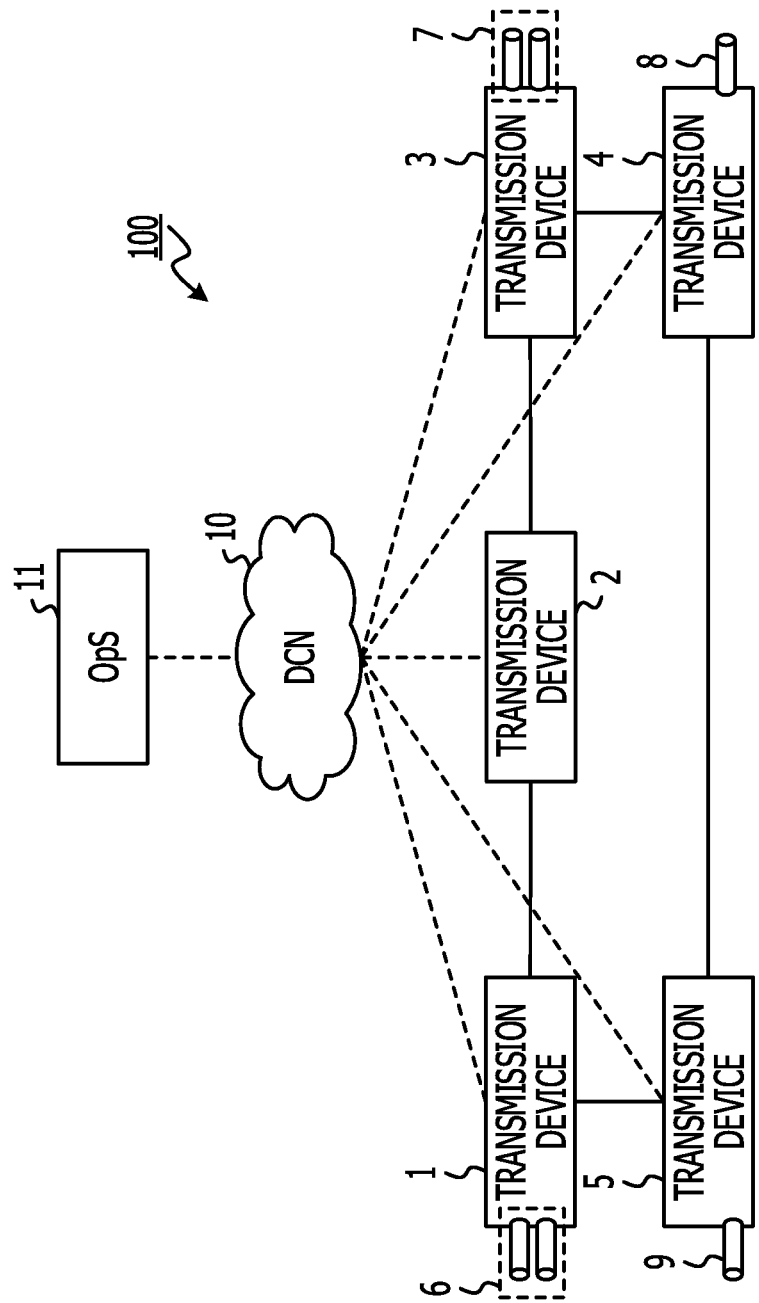
FIG. 1 is a drawing depicting an example of a transmission system in which a transmission device is used.

FIG. 1 is a drawing depicting an example of a transmission system in which a transmission device is used.

A transmission system in which the transmission device of the embodiment is applied will now be described with reference to FIG. 1.

A transmission system 100, which is depicted in FIG. 1, includes transmission devices 1 to 5, LAGs 6 and 7, physical ports 8 and 9, a data communication network (DCN) 10, and an operation system (OpS) 11.

The transmission devices 1 to 5 are each connected to each other via physical lines such as copper wire cables or fiber cables. The transmission devices 1 and 3 are connected to other transmission devices or routers or the like that are not depicted, via the LAGs 6 and 7 in which a plurality of ports that each input and output signals (frames) to a plurality of physical lines are bundled. The transmission devices 4 and 5 are connected to other transmission devices or routers or the like that are not depicted, via the physical ports 8 and 9 constituting ports that each input and output signals to a single physical line. The transmission devices 1 to 5 are, for example, layer 2 switches that support link aggregation. The transmission devices 1 to 5 may be connected to each other by link aggregation. The transmission devices 1 to 5 are not restricted to layer 2 switches, and may be other transmission devices that support a maintenance administration function and link aggregation. A device that transmits a frame to a transmission device is referred to as a first device, and a transmission-destination device that receives a frame from a transmission device is referred to as a second device. The first device and the second device may be transmission devices, and may also be other devices such as routers. The first device and the second device are not particularly restricted as long as the first device and the second device are capable of transmitting and receiving maintenance administration frames.

The OpS 11 is connected to each of the transmission devices 1 to 5 via the DCN 10. The OpS 11 monitors a network via the DCN 10 in accordance with input of the administrator. For example, the administrator sets, via the OpS 11, Maintenance entity group End Point (MEP) that terminate maintenance administration frames at the transmission devices 1 to 5, and Maintenance entity group Intermediate Point (MIP) that relay maintenance administration frames, and so on. The administrator, via the OpS 11, monitors the network by instructing Continuity check (CC), a loopback (LB), and link trace (LT) and so on with respect to the MEPs and the MIPs. A maintenance administration function of the transmission device of the embodiment is hereafter described as an example of monitoring connectivity between MEPs using a CC.

The OpS 11 monitors the connectivity of the network by periodically sending and receiving maintenance administration frames between MEPs. A maintenance administration frame is transmitted from a transmission-side MEP. If a maintenance administration frame is not received either at a fixed time or at a fixed number of times, the reception-side MEP determines that a connection fault has occurred between MEPs, and notifies the OpS 11.

Figure 2:
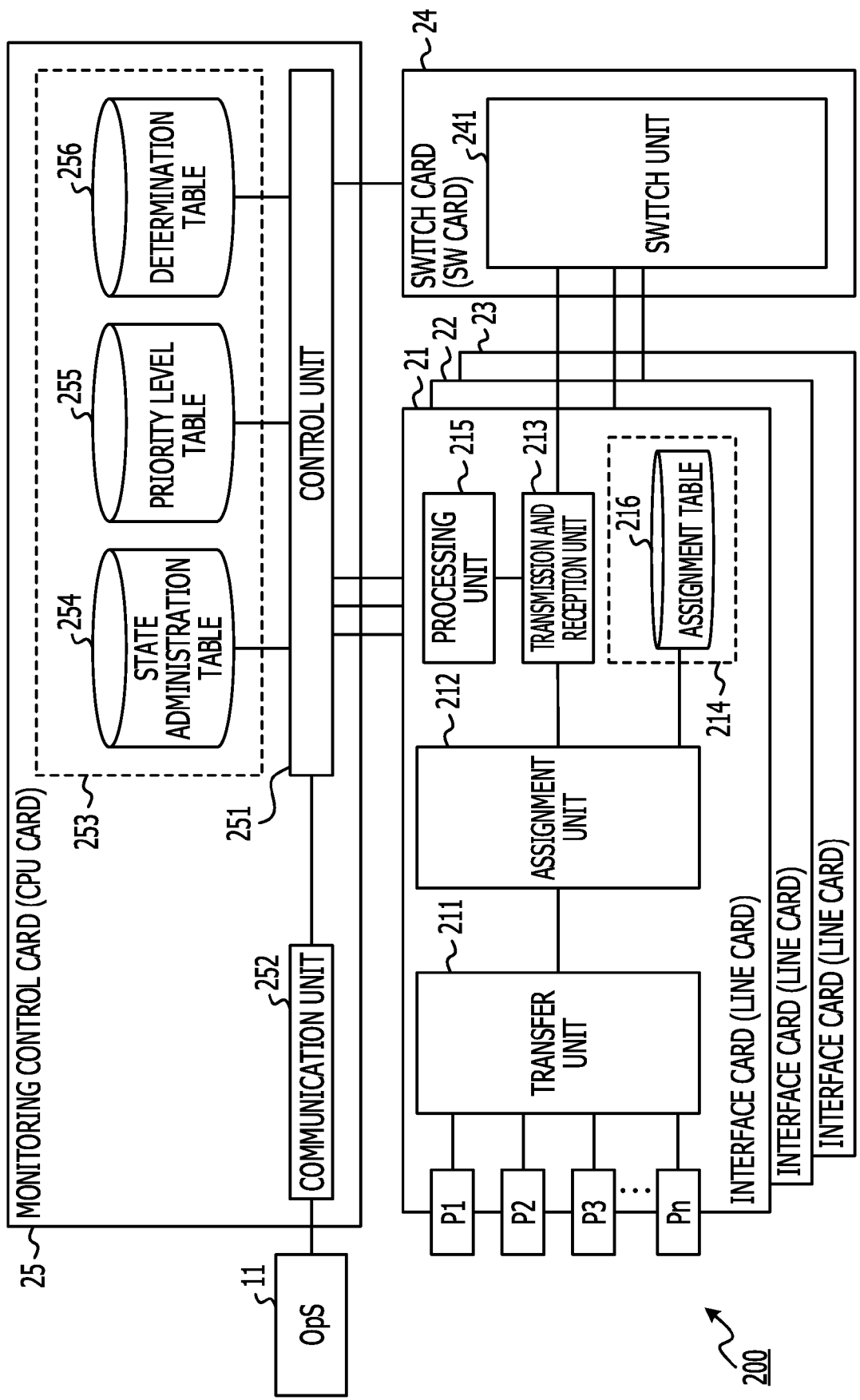
FIG. 2 is a functional block diagram depicting an example of a transmission device.

FIG. 2 is a functional block diagram depicting an example of the transmission device.

A transmission device 200 that is depicted in FIG. 2 includes interface cards (line cards) 21, 22, and 23, a switch card (SW card) 24, a monitoring control card (CPU card) 25, and the OpS 11. The line cards 21, 22, and 23, the SW card 24, and the CPU card 25 are communicably connected to each other. The CPU card 25 and the OpS 11 are communicably connected via the DCN 10 depicted in FIG. 1. Although not depicted, the transmission device 200 has a media access control (MAC) address table. The MAC address table stores the MAC addresses of physical ports, the MAC addresses of LAGs, the MAC addresses of MEPs, and MAC addresses of MIPs. Identification information for identifying the MAC address of a physical port and the MAC address of an LAG may be stored in the MAC address table.

The line cards 21, 22, and 23 each include ports P1 to Pn, a transfer unit 211, an assignment unit 212, a transmission and reception unit 213, a storage unit 214, and a processing unit 215.

The ports P1 to Pn are each connected to physical lines, and transmit and receive frames. The ports P1 to Pn form an LAG in accordance with LAG settings, notified to the CPU card 25 by the administrator via the OpS 11.

The transfer unit 211 searches the MAC address table for a destination MAC address included in a MAC header of a frame input from the ports P1 to Pn. If the destination is an LAG, the transfer unit 211 outputs the frame to the assignment unit 212. The transfer unit 211 searches for the destination MAC address included in the MAC header of the frame input from the ports P1 to Pn. If the destination is a physical port, the transfer unit 211 outputs the frame to the transmission and reception unit 213. The transfer unit 211, for example, may add the identifier of the transfer-destination port to the frame when outputting the frame to a physical port. The SW card 24 may transfer the frame to the transfer-destination port in accordance with the identifier of the transfer-destination port added to the frame.

When the frame is input from the transfer unit 211, the assignment unit 212 refers to an assignment table 216 described hereafter that corresponds to the transfer-destination LAG of the frame, and assigns the transfer destination of the frame to a port for which the transfer setting (transfer information) is "enabled". The assignment unit 212 then inputs the frame to the transmission and reception unit 213. If there is more than one port for which the transfer setting is "enabled", the assignment unit 212 may use a predetermined algorithm to assign the frame to one port. The assignment unit 212 is able to disperse the load on the ports by randomly assigning frames to the ports. The assignment unit 212 may, for example, add the identifier of the transfer-destination port to a frame. The SW card 24 may transfer the frame to the transfer-destination port in accordance with the identifier of the transfer-destination port added to the frame.

The transmission and reception unit 213 has transmission unit and reception unit functions. When a frame is input from the transfer unit 211, the transmission and reception unit 213 functions as a transmission unit. The transmission and reception unit 213 transmits, via the SW card 24, the input frame to the physical port corresponding to the destination MAC address. When a frame is input from the assignment unit 212, the transmission and reception unit 213 functions as a transmission unit. The transmission and reception unit 213 transmits, via the SW card 24, the input frame to the transmission-destination port assigned by the assignment unit 212.

When a maintenance administration frame is input via the SW card 24, the transmission and reception unit 213 functions as a reception unit, and outputs the maintenance administration frame to a transfer-destination port or to the processing unit 215.

The storage unit 214 stores the assignment table 216.

In the processing unit 215, an MEP or an MIP is set by the administrator via the OpS 11. The processing unit 215, when constituting the transmission side for a CC, transmits a maintenance administration frame to another MEP or MIP at each fixed time.

The processing unit 215, when constituting the reception side for a CC, receives a maintenance administration frame at each fixed time from the transmission-side processing unit 215. If a maintenance administration frame is not received at each fixed time from the transmission-side processing unit 215, the processing unit 215 notifies fault information indicating that a port is in a fault state, to a control unit 251 of the CPU card 25.

Figure 8:
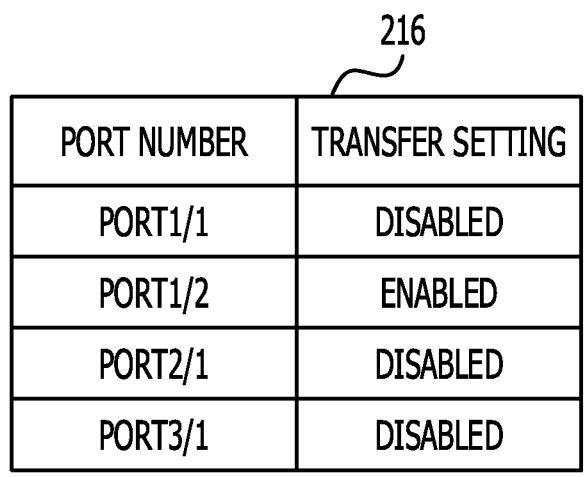
FIG. 8 is a drawing depicting an example of an assignment table.

The assignment table 216, for example, as depicted in FIG. 8 described hereafter, is a table having associated and stored therein the port numbers of ports belonging to an LAG of the transmission device 200, and transfer settings indicating whether or not frames are transferred to the ports. The assignment unit 212 assigns frames to transfer-destination second ports in accordance with the transfer settings stored in the assignment table 216. When the transmission device 200 forms a plurality of LAGs, the assignment table 216 may store a plurality of tables corresponding to each of the LAGs.

The SW card 24 includes a switch unit 241.

When a frame is input from the transfer unit 211 or the assignment unit 212, the switch unit 241 transfers the frame to the transfer-destination port.

The CPU card 25 includes the control unit 251, a communication unit 252, and a storage unit 253.

The control unit 251 monitors the states of the transmission-side physical ports and the second ports belonging to the LAG.

If it is indicated that all of the plurality of second ports are in a fault state, the control unit 251 extracts second ports having port faults from among the plurality of second ports. The control unit 251 controls the assignment unit 212 and causes the frame to be assigned to at least one of the extracted second ports.

If there are a plurality of extracted second ports, the control unit 251 may select one port from among the plurality of extracted second ports, and control the assignment unit 212 and cause the frame to be assigned to the selected second port. In the following description, a case is envisaged which a frame is assigned to one port from among the plurality of extracted second ports if there are a plurality of extracted second ports.

If all of the plurality of second ports are in fault states, and it is indicated that all of the fault states of the plurality of second ports are faults other than port faults, the control unit 251 controls the assignment unit and causes the transfer of frames to the plurality of second ports to be stopped.

The control unit 251 controls the assignment unit 212 and causes a maintenance administration frame to be assigned to a second port having a port fault. If fault information is notified from the processing unit 215, the control unit 251 determines that the fault of the second port to which the maintenance administration frame has been assigned is caused by a port fault.

The control unit 251 controls the assignment unit 212 and causes a maintenance administration frame to be assigned to a second port having a port fault. If fault information is notified from the processing unit 215, the control unit 251 determines that the fault of the second port to which the maintenance administration frame has been assigned is caused by a fault other than a port fault.

If fault information is notified, the control unit 251 selects another second port that is different from the assigned transfer-destination port, from among the plurality of extracted second ports. The control unit 251 may control the assignment unit and cause a maintenance administration frame to be assigned to the other selected second port.

The control unit 251 inputs a monitoring control signal, which is a signal that is input from the OpS 11 via the communication unit 252, to the line cards 21, 22, and 23 and the SW card 24. A monitoring control signal is a signal that instructs settings for MEPs and MIPs, or instructs transmission and reception control of maintenance administration frames for MEPs and MIPs, or the like. A monitoring control signal is a signal that instructs settings for LA with respect to the ports P1 to Pn of each of the line cards 21, 22, and 23.

In addition, the control unit 251 updates a state administration table 254 and a determination table 256 stored in the storage unit 253, in accordance with state information and fault information input from the line cards 21, 22, and 23 and the SW card 24. The state information is information indicating the fault state of a device, detected by the line cards 21, 22, and 23 and the SW card 24. The state information may be notified to the CPU card 25 from the line cards 21, 22, and 23 and the SW card 24 each time a fault state such as a port fault, a card fault, and an inter-card fault is detected by the line cards 21, 22, and 23 and the SW card 24. Furthermore, the state information may be acquired by querying by the CPU card 25 polling the line cards 21, 22, and 23 and the SW card 24. Thus, the control unit 251 monitors the states of the second ports.

The communication unit 252 receives a monitoring control signal transmitted from the OpS 11, and inputs the monitoring control signal to the control unit 251.

The storage unit 253 stores a state administration table 254, a priority level table 255, and a determination table 256.

Figure 6:
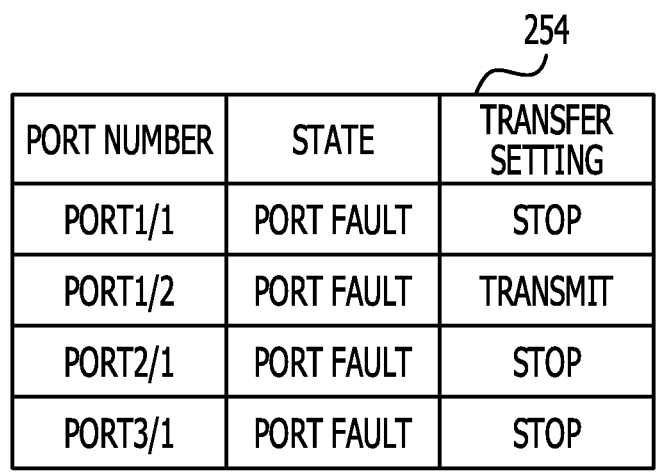
FIG. 6 is a drawing depicting an example of a state administration table.

A state administration table 254 is set for each LAG. As depicted in FIG. 6 described hereafter, a state administration table 254 associates and stores a port number (identifier) for each second port belonging to an LAG, the fault state (state) of the ports, and a frame transfer setting for each of the second ports.

When the control unit 251 has monitored the states of the plurality of second ports, the control unit 251 stores the states of each second port in the state administration table 254. When the control unit 251 extracts a second port having a port fault, the control unit 251 refers to the state administration table 254 and extracts the second port having the port fault. In addition, the control unit 251 stores, in the state administration table 254, a transfer setting indicating that a frame is transferred to the extracted second port. The control unit 251 outputs, to the line cards 21, 22, and 23, the transfer setting stored in the state administration table 254, and stores the transfer setting in the assignment table 216. The assignment unit 212 refers to the assignment table 216 and assigns a frame to a transfer-destination second port. The assignment unit 212 carries out control in such a way that a maintenance administration frame is assigned to the second port extracted by the control unit 251.

Figure 7:
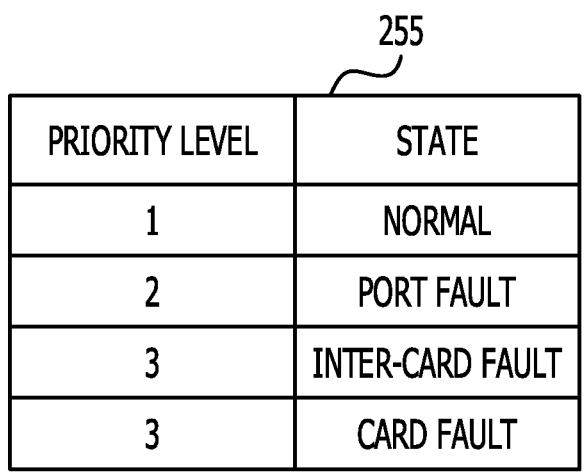
FIG. 7 is a drawing depicting an example of a priority level table.

As depicted in FIG. 7 described hereafter, the priority level table 255 is a table indicating, with respect to the states of the second ports, a relationship in which the priority level decreases in the order of the priority level for a normal state, the priority level for a port fault, and the priority level for a fault other than a port fault. Here, a fault other than a port fault is, for example, a disconnection (inter-card fault) between a first communication circuit having a first port that receives a frame, and a second communication circuit having some or all of a plurality of second ports. A fault other than a port fault is, for example, a communication fault caused by a failure (card fault) of the second communication circuit.

If it is indicated that all of the plurality of second ports are in a fault state, the control unit 251 refers to the priority levels in the priority level table 255, and extracts, as the transfer destination of a maintenance administration frame, a second port having a port fault for which the next highest priority level after a normal state is indicated.

Figure 9:
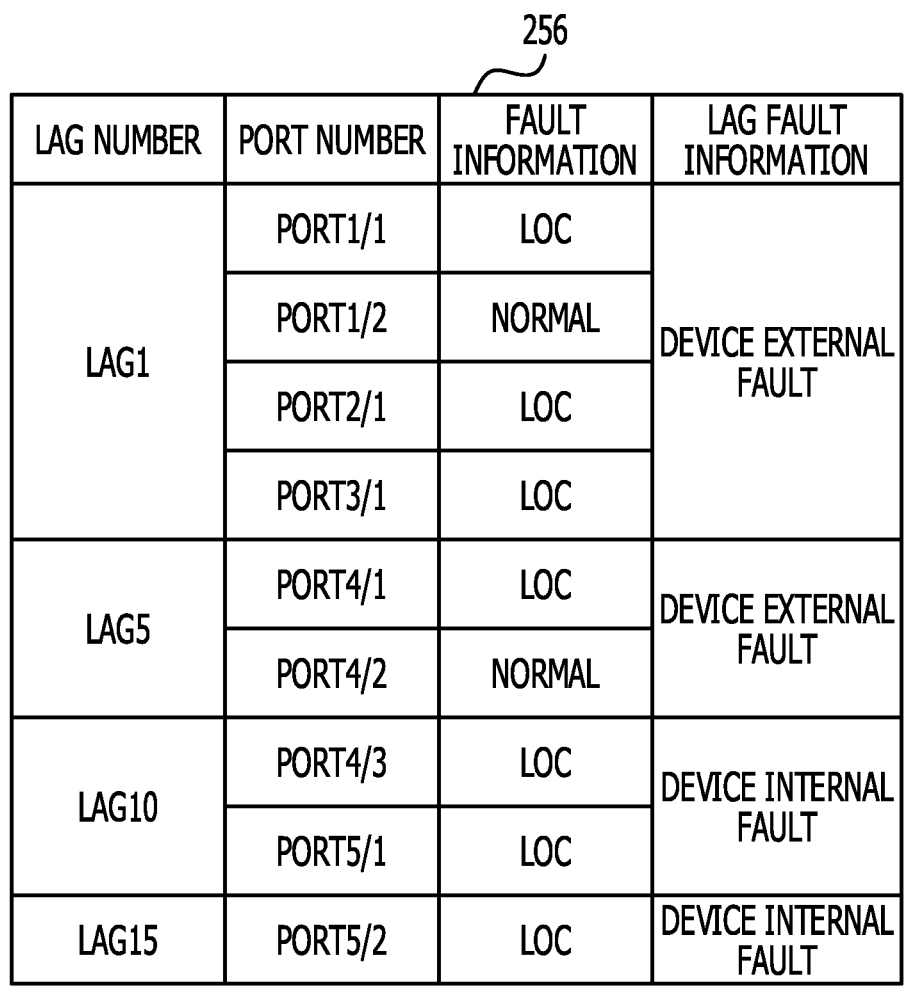
FIG. 9 is a drawing depicting an example of a determination table.

As indicated in FIG. 9 described hereafter, the determination table 256 stores LAG numbers that are identifiers of LAGs, port numbers of the ports belonging to the LAGs, MEP fault information indicating whether or not fault information has been notified from the processing unit 215 of the ports, and LAG fault information that indicates whether or not communication is possible by the LAGs.

Among the second ports belonging to an LAG, if there is a second port determined as being in a normal state by a CC, the control unit 251 determines that a fault of the LAG to which that second port belongs is caused by a device external fault. In other words, several of the plurality of second ports belonging to the LAG have device external faults such as port faults.

Among the second ports belonging to the LAG, if there is no second port determined as being in a normal state by a CC, the control unit 251 determines that a fault of the LAG to which that second port belongs is caused by a device internal fault. In other words, the plurality of second ports belonging to the LAG all have device internal faults such as card faults or inter-card faults.

Figure 3:
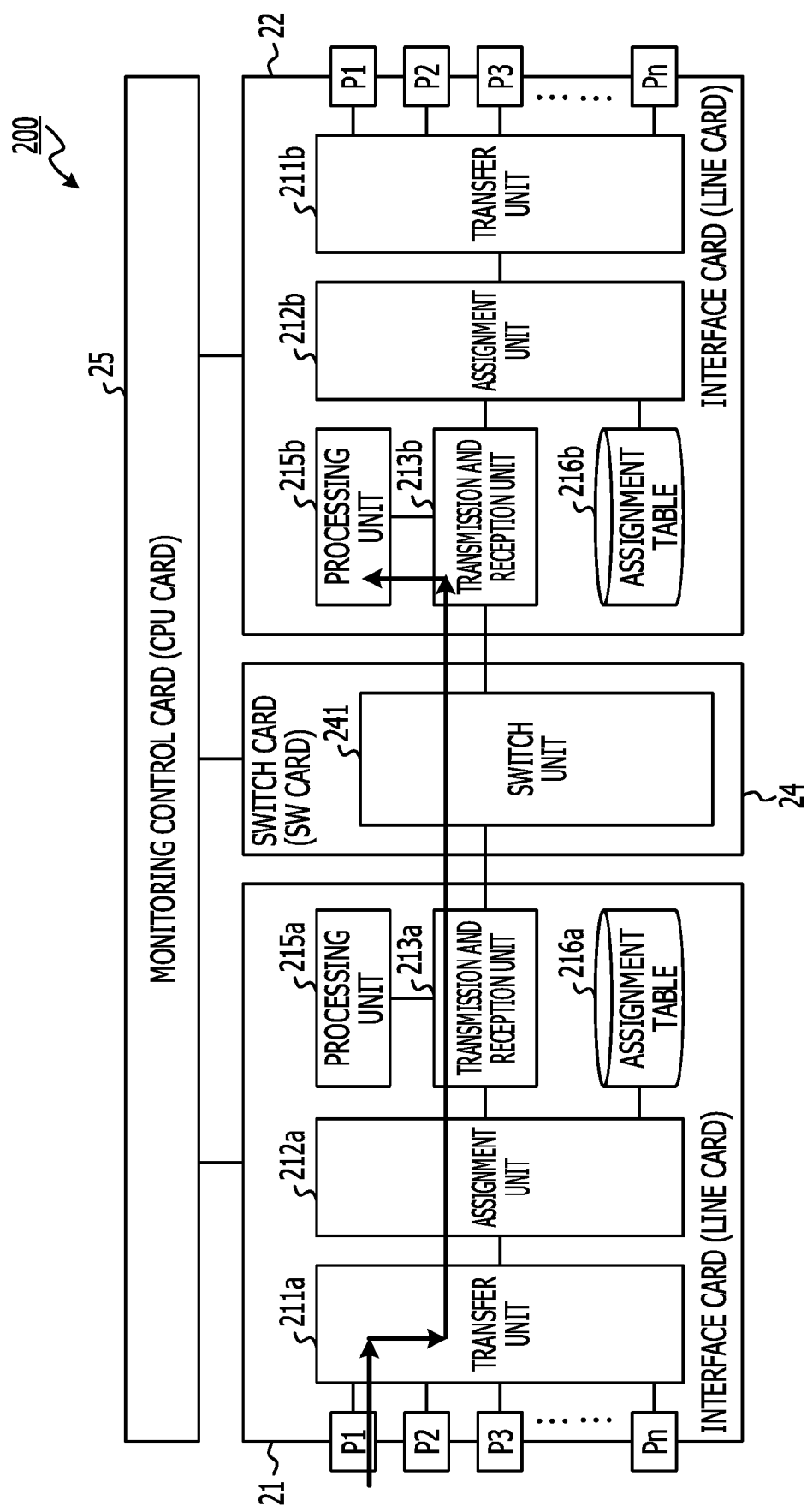
FIG. 3 is a drawing illustrating connectivity confirmation implemented by a maintenance administration function.

FIG. 3 is a drawing illustrating connectivity confirmation implemented by a maintenance administration function.

The transmission device 200 depicted in FIG. 3 includes the line cards 21 and 22, the SW card 24, and the CPU card 25. Connectivity confirmation implemented by the maintenance administration function will now be described with reference to FIG. 3. In the following description, the line card 21 is referred to as a first communication circuit. The line card 22 is referred to as a second communication circuit. The arrow depicted in FIG. 3 indicates the frame transfer flow of a maintenance administration frame.

When a maintenance administration frame is received at a first port, the first communication circuit outputs the maintenance administration frame to a transfer unit 211a.

When the maintenance administration frame is input, if the transfer unit 211a searches the MAC address table for the destination MAC address included in the MAC header and the destination is found to be an LAG, the maintenance administration frame is output to an assignment unit 212a. If the transfer unit 211a searches for the destination MAC address included in the MAC header of the frame input from the port and the destination is found to be a physical port, the maintenance administration frame is output to a transmission and reception unit 213a.

When the maintenance administration frame is input, the assignment unit 212 refers to an assignment table 216a, and assigns the maintenance administration frame to a second port which belongs to the LAG that is the destination of the maintenance administration frame, and which has a transfer setting that is "enabled". The assignment unit 212 then outputs the maintenance administration frame to the transmission and reception unit 213a.

The transmission and reception unit 213a transmits the maintenance administration frame that has been input, to the second communication circuit 22 having the transfer-destination second port.

When the maintenance administration frame is received, a transmission and reception unit 213b of the second communication circuit 22 outputs the maintenance administration frame to a processing unit 215b.

When the maintenance administration frame is input, the processing unit 215b determines that the communication of frames within the device is normal, and waits for the input of the next maintenance administration frame. If a maintenance administration frame is not received either at a fixed time or at a fixed number of times, the processing unit 215b determines that an inter-card fault has occurred between the first communication circuit and the second communication circuit, or that a card fault has occurred in the second communication circuit, and notifies the fault information to the CPU card 25.

When fault information is input from the processing unit 215b, the CPU card 25 determines that a card fault or an inter-card fault has occurred in the transmission device 200.

As described above, the transmission device 200 carries out connectivity confirmation using a maintenance administration frame.

Figure 4:
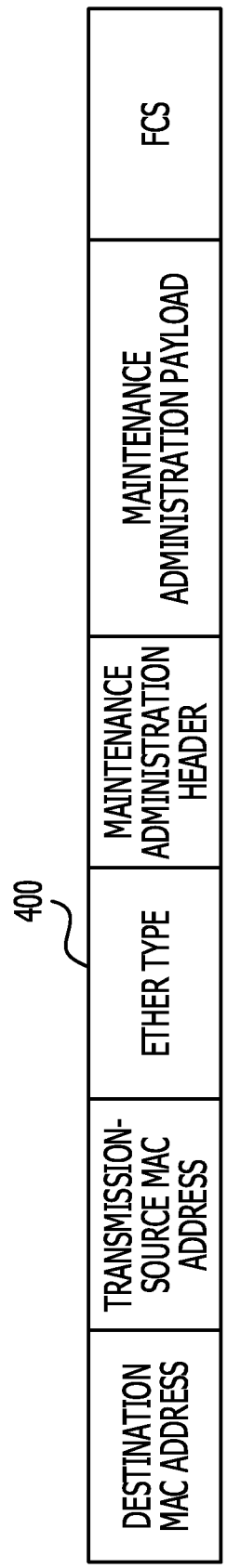
FIG. 4 is a drawing depicting an example of a maintenance administration frame.

FIG. 4 is a drawing depicting an example of a maintenance administration frame.

An example of a maintenance administration frame used in the embodiment will now be described with reference to FIG. 4.

A maintenance administration frame 400 that is depicted in FIG. 4 includes a destination MAC address, a transmission-source MAC address, an ether type, a maintenance administration header, a maintenance administration payload, and an FCS.

The destination MAC address is a field indicating the MAC address of the transfer-destination processing unit 215.

The transmission-source MAC address is a field indicating the MAC address of the transfer-source processing unit 215.

The ether type is a field indicating the frame type. The transfer unit 211 refers to the ether type of an input frame to thereby determine whether or not the frame is a maintenance administration frame.

The maintenance administration header is a field indicating information that specifies the category and so on of the maintenance administration frame.

The maintenance administration payload is a field indicating the data of the maintenance administration frame.

A frame check sequence (FCS) is a field indicating information used for error detection for maintenance administration frames.

Figure 5:
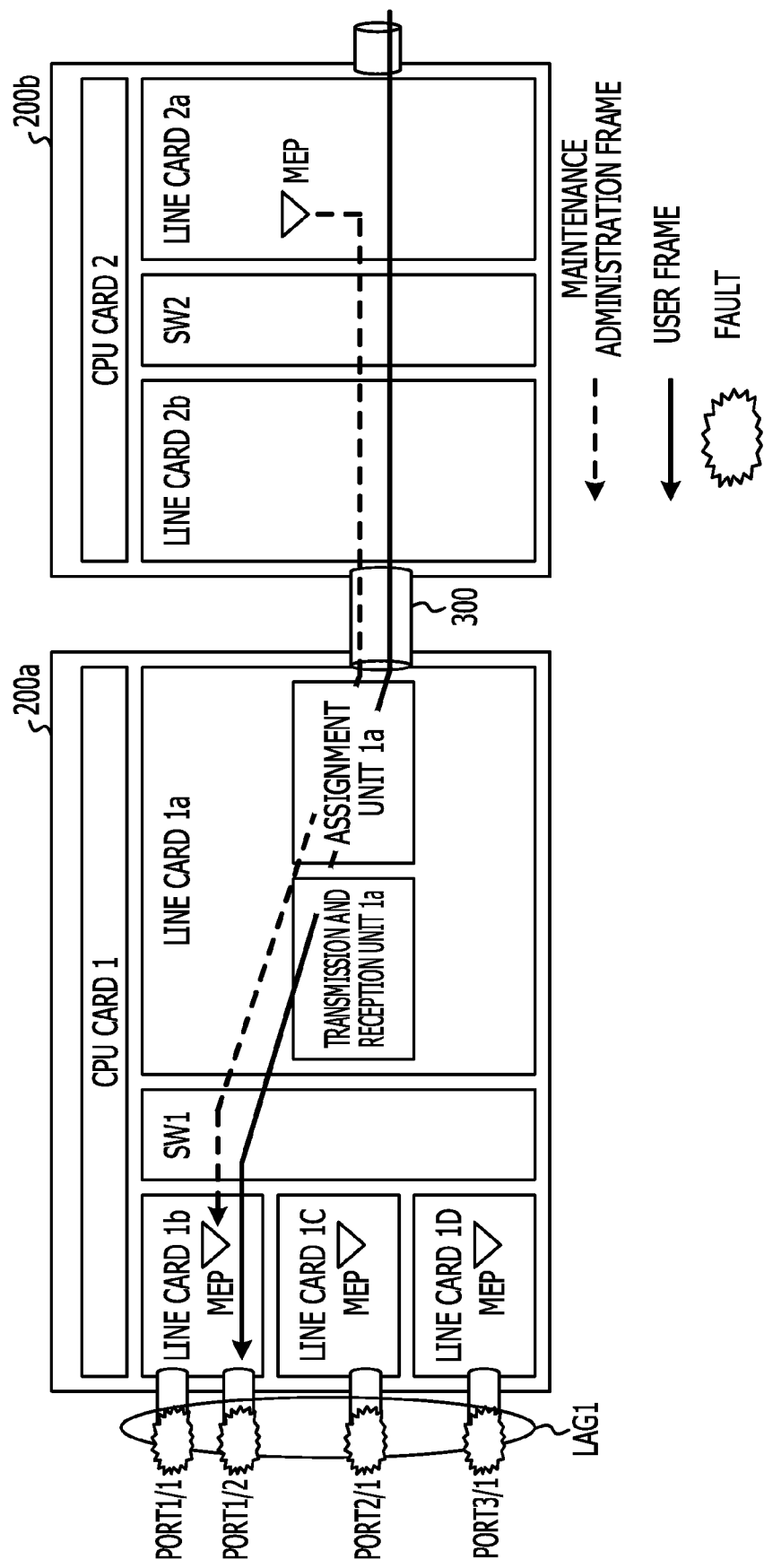
FIG. 5 is a drawing illustrating the determining of a fault state by using a maintenance administration frame.

FIG. 5 is a drawing illustrating the determining of a fault state by using a maintenance administration frame.

FIG. 6 is a drawing depicting an example of a state administration table.

FIG. 7 is a drawing depicting an example of a priority level table.

FIG. 8 is a drawing depicting an example of an assignment table.

FIG. 9 is a drawing depicting an example of a determination table.

It is envisaged that the transmission device 200 of the embodiment corresponds to a transmission device 200a in FIG. 5. The transmission device 200a receives a maintenance administration frame from a transmission device 200b that is a first device, and a user frame. A line card is functions as the line card 21 (first communication circuit) of FIGS. 2 and 3. In addition, line cards 1b to 1d function as the line card 22 (second communication circuit) of FIGS. 2 and 3. An SW 1 functions as the SW card 24 of FIGS. 2 and 3. An assignment unit 1a functions as the assignment unit 212 of FIGS. 2 and 3. A transmission and reception unit 1a functions as the transmission and reception unit 213 of FIGS. 2 and 3. A CPU card 1 functions as the CPU card 25 of FIGS. 2 and 3. The transmission device 200a and the transmission device 200b are connected by a physical port 300, but may also be connected by an LAG instead of the physical port 300. The corresponding relationships of the aforementioned elements are the same in the following description. The transmission device 200 of the embodiment may be applied to the transmission device 200b. Although a description is given with respect to a LAG 1 of the transmission device 200a, the maintenance administration function of the embodiment may be applied to another LAG of the transmission device 200a.

The determining of a fault state by using a maintenance administration frame will now be described with reference to FIGS. 5 to 9.

As depicted in FIG. 5, the transfer destination of a maintenance administration frame transmitted from an MEP of the transmission device 200b and received by the transmission device 200a is an MEP that is set to a line card forming part of the LAG 1. The second ports forming the LAG 1 all have port faults.

If all of the second ports forming the LAG 1 have port faults, fault states are notified from the line cards 1b to 1d and the SW 1. The information depicted in FIG. 6 for example is stored in the state administration table 254. In other words, the fact that the fault states of a port 1/1 to a port 3/1 are caused by port faults is notified from the line cards 1b to 1d having the port 1/1 to the port 3/1 that belong to the LAG. The port 1/1 to the port 3/1 are hereafter also referred to as second ports. The port 1/1 represents the No. 1 port of the line card 1b. The port 1/2 represents the No. 2 port of the line card 1b. The port 2/1 represents the No. 1 port of the line card 1c. The port 3/1 represents the No. 1 port of the line card 1d.

The CPU card 1 refers to the state administration table 254, and determines that all of the second ports have port faults.

Thereupon, the CPU card 1 refers to the priority level table 255 of FIG. 7, and determines that a second port having the port fault of the next highest priority level after the normal state is to be extracted.

Since there are found to be four second ports having port faults when reference is made to the state administration table 254, the CPU card 1 selects the port 1/2 from among the second ports having port faults and transmits the transfer setting, as depicted in FIG. 6. If all of the ports are in a fault state and there are a plurality of second ports having port faults, the control unit 251 of the CPU card 1 may select one port from among the second ports having port faults, in the ascending order or the descending order of the port numbers. Furthermore, if all of the ports are in a fault state and there are a plurality of second ports having port faults, the control unit 251 of the CPU card 1 may use a predetermined algorithm to select one port from among the second ports having port faults.

The CPU card 1 notifies the transfer settings of the state administration table 254 to the line card is as transfer information. When the transfer information is notified from the CPU card 1, the line card is stores the transfer information notified to the assignment table 216, in a transfer setting as depicted in FIG. 8. Here, the "stop" transfer setting in the state administration table 254 and "disabled" in the assignment table 216 correspond. The "transmit" transfer setting of the state administration table 254 and "enabled" in the assignment table 216 correspond.

Thus, when a maintenance administration frame transmitted from an MEP set to the transmission device 200b is input, the transmission device 200a is able to assign the maintenance administration frame to the port 1/2 that has a port fault, by the assignment unit 1a. The transmission device 200a transfers the maintenance administration frame from the line card is to the line card 1b.

When a maintenance administration frame is input to the MEP set to the line card 1b having the port 1/2, the transmission device 200a is able to determine that the fault of the port 1/2 is caused by a device external fault.

In the determination table 256 of the transmission device 200a, as depicted in FIG. 9, since it is determined with respect to the fault information of the LAG 1 that the port 1/2 is normal, "device external fault" is registered in the LAG fault information. In this way, the transmission device 200a determines that the fault information of the LAG is caused by a device external fault if even only one second port belonging to the LAG is normal. Consequently, "LOC" is registered for ports other than the port 1/2 in the fault information of the LAG 1 of the determination table 256. This is because a loss of continuity (LOC) is determined without transmitting maintenance administration frames to the other second ports since it has already been possible to determine the fault state of the LAG. An LOC indicates that a fault has occurred between MEPs. Without restriction to this, the transmission device 200a may also transmit a maintenance administration frame to all second ports having a port fault, and acquire the fault states thereof. A device external fault is, for example, a port fault.

In a LAG 5, which is another LAG of the transmission device 200a, since the port 4/2 is determined as being normal, "device external fault" is registered in the LAG fault information.

In addition, in a LAG 10, which is another LAG of the transmission device 200a, since an LOC is determined for the port 4/3 and also the port 5/1 that belong to the LAG 10, "device internal fault" is registered in the LAG fault information. A device internal fault state is, for example, a card fault or an inter-card fault.

In a LAG 15, which is another LAG of the transmission device 200a, there is only the port 5/2 that belongs to the LAG 15. Consequently, the LAG 15 is a physical port. Since the port 5/2 that is a physical port is determined as having an LOC, "device internal fault" is registered in the LAG fault information. Since the port 5/2 is a physical port, the determination table 256 for physical ports may be stored separately, and physical port fault information may be set as an item instead of LAG fault information.

The CPU card 1 first selects the port 1/2 as a port to which a maintenance administration frame is to be transferred, and as a result of the connectivity confirmation, fault information is notified from the MEP set to the port 1/2. During this process, the CPU card 1 next transfers a maintenance administration frame to the port 2/1 belonging to another line card 1c. If fault information is not notified from the MEP set to the port 2/1, the CPU card 1 may determine that the port 2/1 is normal, and set the LAG fault information as a device external fault.

When the assignment table 216 is in the state depicted in FIG. 8, when a user frame is input, the transmission device 200a may assign the user frame to the port 1/2 by the assignment unit 1a, as depicted in FIG. 5.

Figure 10:
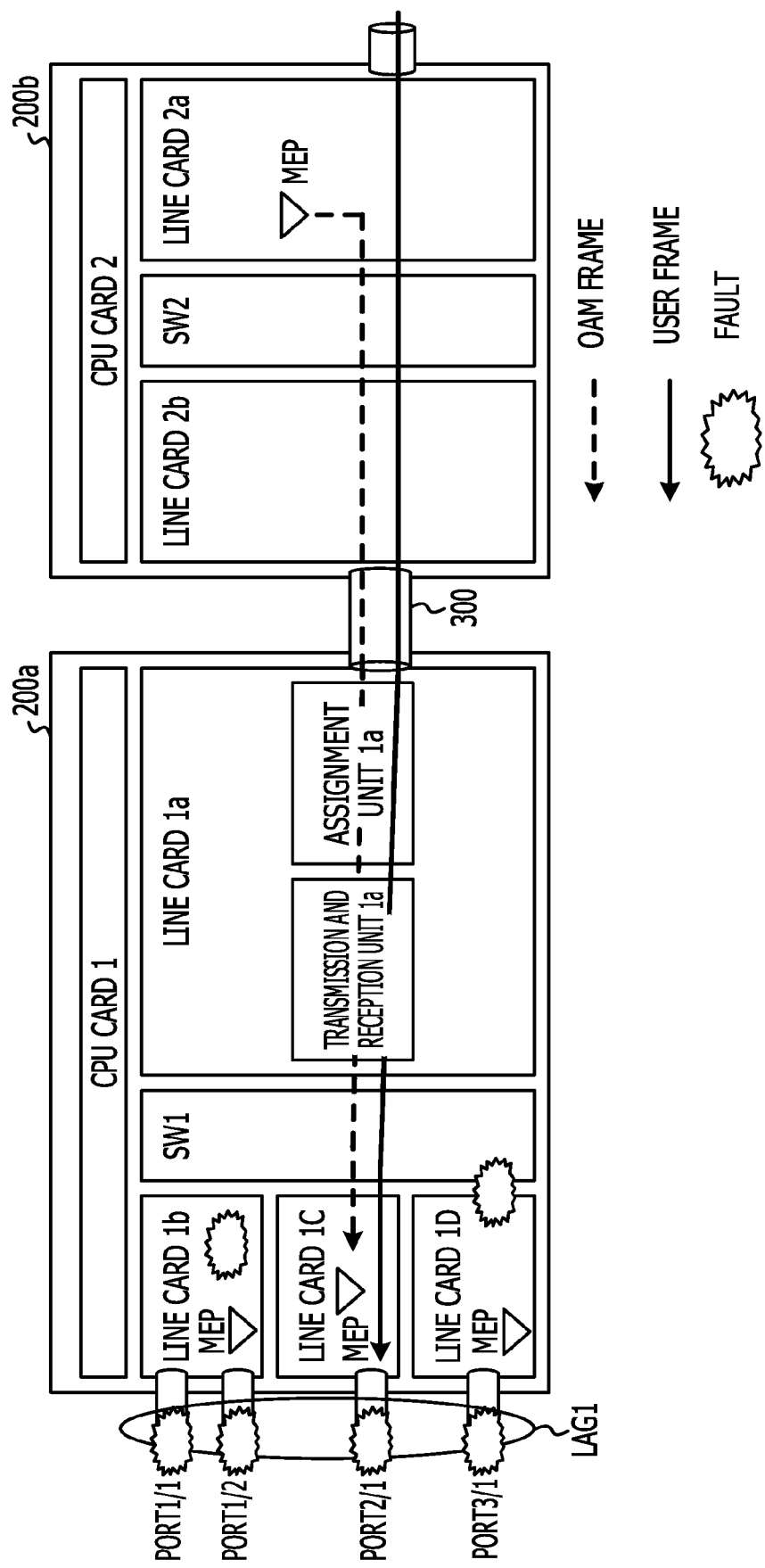
FIG. 10 is a drawing illustrating the determining of a fault state by using a maintenance administration frame.

FIG. 10 is a drawing illustrating the determining of a fault state by using a maintenance administration frame.

Figure 11:
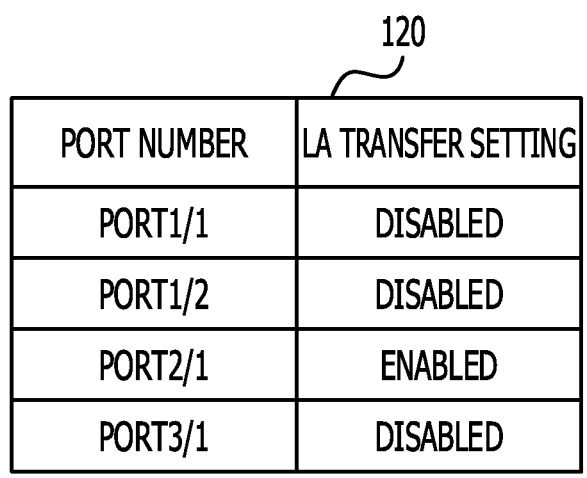
FIG. 11 is a drawing depicting an example of an assignment table.

FIG. 11 is a drawing depicting an example of an assignment table.

The determining of a fault state by using a maintenance administration frame will now be described with reference to FIGS. 10 and 11.

As depicted in FIG. 10, the transfer destination of a maintenance administration frame transmitted from the MEP of the transmission device 200b and received by the transmission device 200a is an MEP that is set to a line card forming part of the LAG 1. The line card 1b has a card fault. The line card 1d and the SW 1 have an inter-card fault. The port 2/1 has a port fault.

As depicted in FIG. 10, since the port 2/1 is the only second port having a port fault from within the LAG 1, the CPU card 1 sets the assignment table 216 in such a way as depicted in FIG. 11. In other words, a setting is implemented such that a maintenance administration frame is transferred to the port 2/1.

Thus, when a maintenance administration frame transmitted from the MEP set to the transmission device 200b is input, the transmission device 200a is able to assign the maintenance administration frame to the port 2/1 that has a port fault, by the assignment unit 1a. The transmission device 200a then transfers the maintenance administration frame from the line card is to the line card 1c.

If the maintenance administration frame is input to the MEP set to the line card is having the port 2/1, the transmission device 200a is able to determine that the fault of the port 2/1 is caused by a device external fault.

If the maintenance administration frame is not input to the MEP set to the line card is having the port 2/1, the transmission device 200a is able to determine that the fault of the port 2/1 is caused by a device internal fault.

If the assignment table 216 is in the state depicted in FIG. 11, when a user frame is input, the transmission device 200a may assign the user frame to the port 2/1 by the assignment unit 1a, as depicted in FIG. 10.

Figure 12:
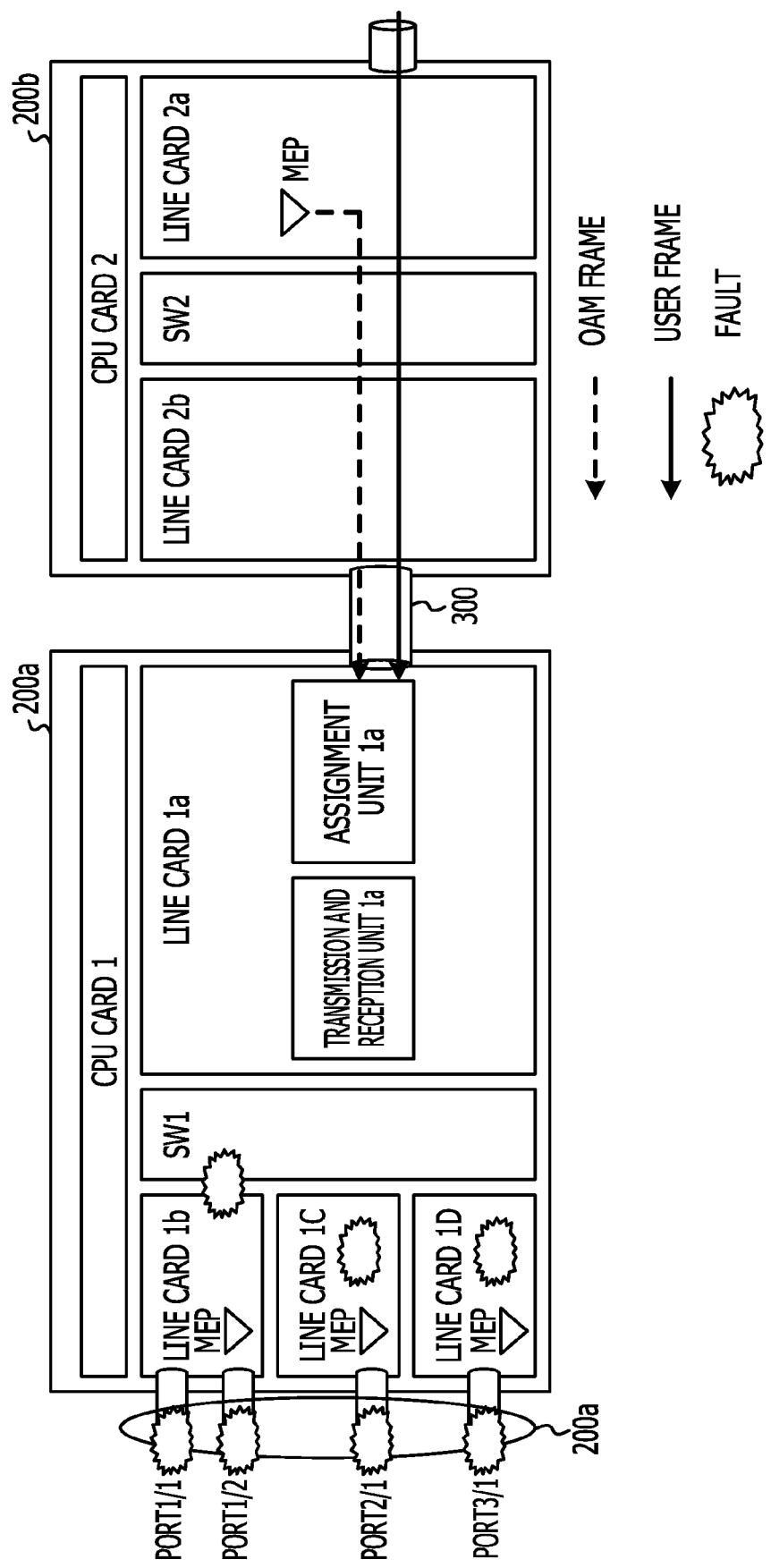
FIG. 12 is a drawing illustrating the determining of a fault state by using a maintenance administration frame.

FIG. 12 is a drawing illustrating the determining of a fault state by using a maintenance administration frame.

Figure 13:
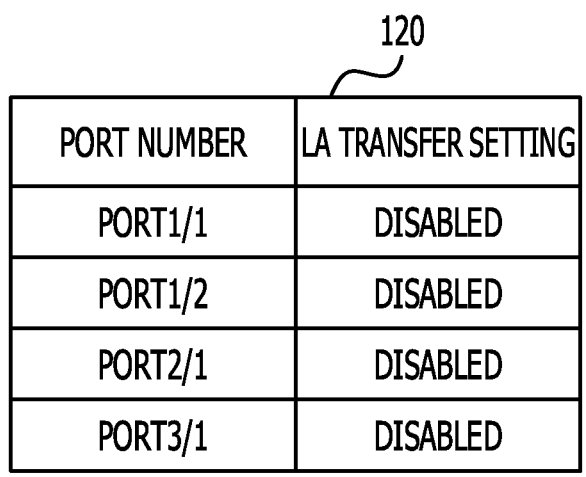
FIG. 13 is a drawing depicting an example of an assignment table.

FIG. 13 is a drawing depicting an example of an assignment table.

The determining of a fault state by using a maintenance administration frame will now be described with reference to FIGS. 12 and 13.

As depicted in FIG. 12, the transfer destination of a maintenance administration frame transmitted from the MEP of the transmission device 200b and received by the transmission device 200a is an MEP that is set to a line card forming part of the LAG 1. The line card 1b has a card fault has an inter-card fault with the SW 1. The line card is and the line card 1d have card faults.

As depicted in FIG. 12, there is no second port that has a port fault within the LAG 1. Therefore, the CPU card 1 sets the assignment table 216 in such a way as depicted in FIG. 13. In other words, the transmission device 200a implements settings such that a maintenance administration frame is not transferred to all of the second ports belonging to the LAG 1.

Thus, for example, when a maintenance administration frame transmitted from the MEP set to the transmission device 200b is input, the transmission device 200a destroys the maintenance administration frame by the assignment unit 1a. The transmission device 200a may stop the received maintenance administration frame at the reception-side first port.

Since a maintenance administration frame is not input to the MEPs set to all of the line cards 1b to 1d, the transmission device 200a is able to determine that the faults of the port 1/1 to the port 3/1 are all device internal faults.

If the assignment table 216 is in the state depicted in FIG. 13, when a user frame is input, the transmission device 200a may destroy the user frame by the assignment unit 1a, as depicted in FIG. 12. The transmission device 200a may stop the received maintenance administration frame at the reception-side first port.

FIG. 14 is a drawing illustrating a method for setting transfer settings in an assignment table.

The setting of transfer settings in the assignment table 216 will now be described with reference to FIGS. 2 and 14.

The control unit 251 monitors the second ports belonging to an LAG, and determines whether or not there is a normal port in the second ports belonging to the LAG (S1). If there is a normal port in the second ports belonging to the LAG (yes in S1), the control unit 251 sets the transfer settings in the assignment table 216 to "enabled" with respect to all ports that are normal ports (S2). The control unit 251 then finishes setting the transfer settings in the assignment table 216.

If there is no normal port in the second ports belonging to the LAG (no in S1), the control unit 251 determines whether or not there is a port having a port fault in the second ports belonging to the LAG (S3). If there is a port having a port fault in the second ports belonging to the LAG (yes in S3), the control unit 251 sets the transfer setting in the assignment table 216 to "enabled" with respect to one arbitrary port having a port fault (S4). The control unit 251 then finishes setting the transfer settings in the assignment table 216. The one arbitrary port having a port fault may be determined using a predetermined algorithm.

If there is no port having a port fault in the second ports belonging to the LAG (no in S3), the control unit 251 sets the transfer settings in the assignment table 216 to "disabled" with respect to all second ports belonging to the LAG (S5).

As described above, if, as a result of monitoring the second ports belonging to the LAG, it is found that the second ports are all in fault states and there is a port having a port fault, the control unit 251 of the transmission device 200 implements settings such that a frame is transferred to at least one port having a port fault. Thus, if a maintenance administration frame is received, the transmission device 200 is able to transfer the maintenance administration frame to a second port having a port fault, by the assignment unit 212.

If fault information is not notified from the processing unit 215 of the second communication circuit after a maintenance administration frame has been transferred to a second port having a port fault, the transmission device 200 is able to determine that a second port has a port fault, by using the maintenance administration function. If fault information is notified from the processing unit 215 of the second communication circuit after a maintenance administration frame has been transferred to a second port having a port fault, the transmission device 200 is able to determine that a second port has a fault other than a port fault, by using the maintenance administration function.

In addition, if, as a result of monitoring the second ports belonging to the LAG, it is found that the second ports are all in fault states and there is no port having a port fault, the control unit 251 of the transmission device 200 implements settings such that a maintenance administration frame is not transferred to all of the second ports belonging to the LAG. Therefore, if a maintenance administration frame is received, the transmission device 200 does not transfer the maintenance administration frame to the second ports. Thereupon, since fault information is notified from the processing unit 215 of the second communication circuit, the transmission device 200 is able to determine that a second port has a fault other than a port fault, by using the maintenance administration function.

FIG. 15 is a drawing illustrating the setting of LAG fault information in a determination table.

The setting of LAG fault information in the determination table 256 will now be described with reference to FIGS. 2, 9, and 15.

In the following description, a case is envisaged in which all ports are found to have port faults when ports of second communication circuits have been monitored by the control unit 251.

The control unit 251 refers to the determination table 256 and searches for the port number of a port for which a fault state is to be determined, and thereby determines whether or not the port is a physical port (S6). If the port for which a fault state is to be determined is a physical port (yes in S6), the control unit 251 sets LAG fault information in accordance with fault information acquired with respect to the port for which a fault state is to be determined (S7). As an example, if the fault information of the port is an LOC, the control unit 251 determines that the LAG fault information is a device internal fault, as depicted by LAG 15 in FIG. 9. If the fault information of the port is normal, the control unit 251 determines that LAG fault information is a device external fault. The control unit 251 then finishes setting the LAG fault information in the determination table 256. The determination table 256 for physical ports may be stored separately for the physical ports, and physical port fault information may be set as an item instead of LAG fault information.

If the port for which fault information is to be determined belongs to an LAG (no in S6), the control unit 251 determines whether or not all of the second ports belonging to the LAG have an LOC (S8). If all of the second ports belonging to the LAG have an LOC (yes in S8), the control unit 251 determines that the LAG fault information of the LAG is a device internal fault (S9). The control unit 251 then finishes setting the LAG fault information in the determination table 256.

If there is a port having a normal state in the second ports belonging to the LAG (no in S8), the control unit 251 determines that the LAG fault information of the LAG is a device external fault (S10). The control unit 251 then finishes setting the LAG fault information in the determination table 256.

As described above, if the monitored second ports all have port faults, the control unit 251 uses the maintenance administration function to acquire the fault states of the second ports. The control unit 251 then refers to the fault states of the second ports stored in the determination table 256. If there is even only one second port having a normal state among the second ports belonging to the LAG, the control unit 251 determines that the corresponding LAG fault information is a device external fault. The control unit 251 refers to the fault states of the second ports stored in the determination table 256. If all of the second ports belonging to the LAG are in a fault state, the control unit 251 determines that the corresponding LAG fault information is a device internal fault.

In this way, if there is even only one second port having a normal state among the second ports belonging to the LAG, the control unit 251 determines that the LAG fault information is normal, and is therefore able to confirm connectivity with respect to a construction having redundancy in the transmission of frames by using an LAG.

If the second ports belonging to an LAG are all in a fault state, the aforementioned transmission device of the embodiment assigns the transfer destination of a maintenance administration frame to a second port having a port fault. When the maintenance administration frame is received, the transmission device transmits the maintenance administration frame to the second communication circuit having the transfer-destination second port. Thus, the transmission device uses the maintenance administration frame to determine device external faults such as a port fault, and device internal faults such as a card fault and an inter-card fault. Consequently, the transmission device of the embodiment is able to specify a fault location by using the maintenance administration function.

Since a fault location is able to be specified using the maintenance administration function, the transmission device of the embodiment no longer necessitates an administrator to directly operate the device to specify a fault location, and reduces the workload relating to the specifying of a fault location. Therefore, the transmission device of the embodiment is able to easily determine a fault state.

Large-scale integrations (LSI) such as a field-programmable gate array (FPGA), an application-specific integrated circuit (ASIC), or an application-specific standard product (ASSP) are used for the line cards 21, 22, and 23, the SW card 24, and the CPU card 25 of the aforementioned transmission device 200.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transmission device that transmits frames, the transmission device comprising:

a first port;

a plurality of second ports which belong to an identical link aggregation group (LAG);

a memory; and a processor coupled to the memory and configured to:
receive a frame via the first port,
extract one or more second ports having port faults from among the plurality of second ports belonging to the identical LAG when all of the plurality of second ports are in a fault state and at least one of the extracted one or more second ports has a connection fault of a next highest priority level after a normal state according to priority levels of states of the plurality of second ports that decrease in order of a priority level for a normal state, a priority level for a connection fault, and a priority level for a fault between a first communication circuit and a second communication circuit and a fault of the second communication circuit, and
transmit the received frame to the extracted one or more second ports,
to thereby determine a cause of a fault of the extracted one or more second ports according to the port faults of the extracted one or more second ports to which the received frame is transmitted.

2. The transmission device according to claim 1, wherein the memory is configured to store a state management table in which a port number, a state, and a transfer setting indicating whether a frame transfer is available are associated with each other, and
the processor is configured to determine whether all of the plurality of second ports are in the fault state by referring to the state management table.

3. The transmission device according to claim 1, wherein to extract the one or more second ports, the processor is configured to stop transfer of the frame to the plurality of second ports, when all of the plurality of second ports are in a fault state of a link-down state and all of the plurality of second ports have a fault other than a connection fault.

4. The transmission device according to claim 3, wherein the fault other than the connection fault is a fault between a first communication circuit having the first port and a second communication circuit having some or all of the plurality of second ports, or is a fault of the second communication circuit.

5. The transmission device according to 4, wherein the processor is configured to:
when fault information is not notified from the at least extracted one or more second ports, determine that a fault of the extracted one or more second ports is caused by only the connection fault, and
when the fault information is notified from the extracted one or more second ports, determine that a fault of the extracted one or more second ports is caused by the connection fault and the fault other than the connection fault.

6. The transmission device according to claim 1, wherein the memory is configured to store an assignment table including transfer information indicating whether transfer may be performed with respect to the plurality of second ports,
the processor is configured to:
cause the memory to store the transfer information in the assignment table, and
extract the one or more second ports based on the transfer information.

7. The transmission device according to claim 6, wherein to store the transfer information, the processor is configured to use a predetermined algorithm to assign the frame to a second port from among the plurality of second ports in the assignment table.

8. The transmission device according to claim 1, wherein,
the memory is configured to store a state administration table, for the plurality of second ports, of an identifier, a state, and transfer information of frames, and to store a priority level table of the priority levels of states of the plurality of second ports,
the processor extracts the one or more second ports based on the state administration table and the priority level in the priority level table.

9. A transmission method implemented by a transmission device that transmits frames, the transmission method comprising:
storing a priority level table of priority levels that indicates, with respect to states of the plurality of second ports, a relationship in which a priority level decreases in order of a priority level for a normal state, a priority level for a connection fault, and a priority level for a fault between a first communication circuit and a second communication circuit and a fault of the second communication circuit;
receiving a frame via the first port;
extracting one or more second ports having port faults from among the plurality of second ports belonging to an identical link aggregation group (LAG) when all of the plurality of second ports are in a fault state, and at least one of the extracted one or more second ports has a connection fault of a next highest priority level after a normal state according to the priority levels in the priority level table; and
transmitting the received frame to the extracted one or more second ports,
to thereby determine a cause of a fault of the extracted one or more second ports according to the port faults of the extracted one or more second ports to which the received frame is transmitted.

10. A transmission device that transmits frames, the transmission device comprising:
a first port;
a plurality of second ports which belong to an identical link aggregation group (LAG);
a memory configured to store a priority level table of priority levels that indicates, with respect to states of the plurality of second ports, a relationship in which a priority level decreases in order of a priority level for a normal state, a priority level for a connection fault, and a priority level for a fault between a first communication circuit and a second communication circuit and a fault of the second communication circuit; and
a processor coupled to the memory and configured to:
receive a frame via the first port,
extract one or more second ports having port faults from among the plurality of second ports belonging to the identical LAG when all of the plurality of second ports are in a fault state and at least one of the extracted one or more second ports has a connection fault of a next highest priority level after a normal state according to the priority levels in the priority level table, and
transmit the received frame to the extracted one or more second ports,
to thereby determine a cause of a fault of the extracted one or more second ports according to the port faults of the extracted one or more second ports to which the received frame is transmitted.

* * * * *